United States Patent [19]

Jacobsen et al.

[11] Patent Number: 6,043,180
[45] Date of Patent: Mar. 28, 2000

[54] SUPPORTED CATALYST COMPONENT, SUPPORTED CATALYST, THEIR PREPARATION, AND ADDITION POLYMERIZATION PROCESS

[75] Inventors: Grant B. Jacobsen, Houston, Tex.; Peter L. Wauteraerts, Oostham, Belgium; Lee Spencer, Pearland, Tex.

[73] Assignee: The Dow Chemical Company, Midland, Mich.

[21] Appl. No.: 08/909,236

[22] Filed: Aug. 11, 1997

Related U.S. Application Data

[63] Continuation-in-part of application No. 08/555,436, Nov. 9, 1995, abandoned, which is a continuation-in-part of application No. 08/340,989, Nov. 17, 1994, abandoned.

[51] Int. Cl.[7] .............................. B01J 31/00; B01J 37/00; C08F 4/02; C08F 4/60
[52] U.S. Cl. ........................ 502/103; 502/104; 502/107; 502/111; 502/117
[58] Field of Search ................................. 502/103, 104, 502/107, 111, 117

[56] References Cited

U.S. PATENT DOCUMENTS

| | | | |
|---|---|---|---|
| 4,542,119 | 9/1985 | Hsu et al. | 502/153 |
| 5,026,797 | 6/1991 | Takahashi | 526/124 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,091,352 | 2/1992 | Kioka et al. | 502/103 |
| 5,096,867 | 3/1992 | Canich | 502/103 |
| 5,132,380 | 7/1992 | Stevens et al. | 526/126 |
| 5,147,949 | 9/1992 | Chang | 526/129 |
| 5,183,867 | 2/1993 | Welborn, Jr. | 526/114 |
| 5,227,440 | 7/1993 | Canich et al. | 526/129 |
| 5,240,894 | 8/1993 | Burkhardt et al. | 502/108 |
| 5,252,529 | 10/1993 | Ueda et al. | 502/113 |
| 5,446,001 | 8/1995 | Gurtzgen | 502/151 |
| 5,473,028 | 12/1995 | Nowlin et al. | 526/114 |
| 5,602,067 | 2/1997 | Nowlin et al. | 502/104 |
| 5,789,332 | 8/1998 | Kutschera et al. | 502/104 |
| 5,856,255 | 1/1999 | Krzystowczyk et al. | 502/107 |

FOREIGN PATENT DOCUMENTS

| | | |
|---|---|---|
| 2 150 890 | 12/1995 | Canada . |
| 0285443 | 10/1988 | European Pat. Off. . |
| 0323716 | 7/1989 | European Pat. Off. . |
| 0368644 | 5/1990 | European Pat. Off. . |
| 0416815 | 3/1991 | European Pat. Off. . |
| 0523416 | 1/1993 | European Pat. Off. . |
| 0567952 | 4/1993 | European Pat. Off. . |
| 0545152 | 6/1993 | European Pat. Off. . |
| 0560128 | 9/1993 | European Pat. Off. . |
| 0578838 | 1/1994 | European Pat. Off. . |
| 0582480 | 2/1994 | European Pat. Off. . |
| 0615981 | 9/1994 | European Pat. Off. . |
| 0685494 | 12/1995 | European Pat. Off. . |
| 6-345808 | 12/1994 | Japan . |
| 6-345816 | 12/1994 | Japan . |
| 6-345817 | 12/1994 | Japan . |
| 89/02453 | 3/1989 | WIPO . |
| 93/19104 | 9/1993 | WIPO . |
| 94/03506 | 2/1994 | WIPO . |
| 95/12622 | 5/1995 | WIPO . |
| 95/18809 | 7/1995 | WIPO . |
| 95/18836 | 7/1995 | WIPO . |

OTHER PUBLICATIONS

Derwent 93–232372/29 Dec. 1991.
Derwent 93–232373/29 Dec. 1991.
Derwent 93–252758/32 Dec. 1991.
Derwent 93–252759/32 Dec. 1991.
Derwent Abstract 96–01233[02] (CA 2 150 890).

*Primary Examiner*—Mark L. Bell
*Assistant Examiner*—J. Pasterczyk

[57] ABSTRACT

A supported catalyst component prepared from a support material and an alumoxane, containing 15–40 weight percent of aluminum from the alumoxane (based on the total weight of the support material and alumoxane), said supported catalyst component being obtained by heating said support material and alumoxane under an inert atmosphere at a temperature of from about 85 to about 250° C. for a period sufficient to fix said alumoxane to the support material, to provide a supported catalyst component; wherein not more than about 10 percent aluminum from said alumoxane and present in the supported catalyst component is extractable in a one-hour extraction with toluene at 90° C. using 10 ml toluene per gram of supported catalyst component; and a transition metal compound, and a process for the preparation of the supported catalyst.

20 Claims, No Drawings

SUPPORTED CATALYST COMPONENT, SUPPORTED CATALYST, THEIR PREPARATION, AND ADDITION POLYMERIZATION PROCESS

CROSS-REFERENCE TO RELATED APPLICATION

This application is a continuation-in-part of copending application Ser. No. of 08/555,436, filed on Nov. 9, 1995, now abandoned, which is a continuation-in-part of application Ser. No. 08/340,989, filed on Nov. 17, 1994, which is now abandoned.

FIELD OF THE INVENTION

The present invention relates to a supported catalyst component comprising a support material and alumoxane, to a supported catalyst comprising a support material, alumoxane, and a metallocene compound, to a process for preparing such a supported catalyst component and catalyst, and to an addition polymerization process using such a supported catalyst.

BACKGROUND OF THE INVENTION

Homogeneous or non-supported alumoxane metallocene catalysts are known for their high catalytic activity in olefin polymerizations. Under polymerization conditions where polymer is formed as solid particles, these homogeneous (soluble) catalysts form deposits of polymer on reactor walls and stirrers, which deposits should be removed frequently as they prevent an efficient heat-exchange, necessary for cooling the reactor contents, and cause excessive wear of the moving parts. The polymers produced by these soluble catalysts further have a low bulk density which limits the commercial utility of both the polymer and the process. In order to solve these problems, several supported alumoxane metallocene catalysts have been proposed for use in particle forming polymerization processes.

U.S. Pat. No. 5,057,475 describes a supported metallocene alumoxane catalyst wherein the alumoxane can be a commercial alumoxane, or an alumoxane generated in situ on the solid support, for example, by the addition of a trialkylaluminum compound to a water-containing support, such as by addition of trimethylaluminum to a water containing silica. In the preferred methods of U.S. Pat. No. 5,057,475, the metallocene component and the alumoxane (which previously may have been combined with a modifier compound) are combined in a first step in a suitable solvent. In a subsequent step, this solution is contacted with the support. Then, the solvent can be removed, typically by applying a vacuum. The solution may be heated in order to aid in the removal of the solvent. In an alternative method, an undehydrated silica gel is added to a solution of trialkylaluminum to produce an alumoxane which is deposited onto the surface of the silica gel particles. Then, the solvent is removed and the residual solids are dried to a free-flowing powder. In typical examples, dried silica is slurried with an alumoxane in toluene, filtered, washed with pentane, and then dried under vacuum. The metallocene compound is typically combined with an alumoxane in toluene or heptane, which solution subsequently is combined with the pretreated silica. Finally, the toluene or heptane is removed under vacuum to recover the supported catalyst.

U.S. Pat. No. 5,026,797 describes treating a porous water-insoluble inorganic oxide particle support with an alumoxane in a solvent for the alumoxane, such as an aromatic hydrocarbon, followed by rinsing the treated support with an aromatic hydrocarbon solvent until no alumoxane is detected in the supernatant. Thus, it is said to be possible to adjust the amount of the aluminum atom of the alumoxane bonded onto the treated oxide support in the range of 2 to 10 percent by weight. Subsequently, the treated support is combined with a zirconium compound. The so-formed support material containing alumoxane and zirconium compound is used together with additional alumoxane in solution in a polymerization reaction.

U.S. Pat. No. 5,147,949 discloses supported metallocene alumoxane catalysts prepared by adding a water-impregnated catalyst support to a stirred solution of an aluminum trialkyl, and adding to the reaction product thereof a metallocene component.

U.S. Pat. No. 5,240,894 describes a method to produce a supported catalyst by forming a metallocene/alumoxane reaction solution, adding a porous carrier, evaporating the resulting slurry so as to remove residual solvent from the carrier, and optionally prepolymerizing the catalyst with olefinic monomer. A good polymer bulk density is only obtained using a prepolymerized supported catalyst.

U.S. Pat. No. 5,252,529 discloses solid catalysts for olefin polymerization comprising a particulate carrier containing at least one percent by weight of water, an alumoxane compound, and a metallocene compound. In the preparation of this catalyst, the reaction product of the particulate carrier and the alumoxane is separated from the diluent (toluene) by decantation or drying at reduced pressure.

European Patent No. Application No. 368,644 discloses a process for preparing a supported metallocene alumoxane catalyst wherein an undehydrated silica gel is added to a stirred solution of triethylaluminum, to which reaction mixture is added a solution of a metallocene to which trimethylaluminum has been added. Following the addition of the trimethylaluminum treated metallocene to the triethylaluminum treated silica gel solids, the catalyst is dried to a free-flowing powder. Drying of the catalyst may be done by filtration or evaporation of solvent at a temperature up to about 85° C.

European Patent Application No. 323,716 discloses a process for preparing a supported metallocene alumoxane catalyst by adding undehydrated silica gel to a stirred solution of an aluminum trialkyl, adding a metallocene to the reacted mixture, removing the solvent, and drying the solids to a free-flowing powder. After the metallocene has been added, the solvent is removed and the residual solids are dried at a temperature of up to about 85° C.

European Patent Application No. 523,416 describes a supported catalyst component for olefin polymerization prepared from an inorganic support and a metallocene. The metallocene and support are intensively mixed in a solvent. Preferably, the catalyst component thus obtained is extracted in a suitable solvent, such as toluene, to remove metallocene which is not fixed. Subsequently, alumoxane can be added as a cocatalyst.

European Patent Application No. 567,952 describes a supported polymerization catalyst comprising the reaction product of a supported organoaluminum compound and a metallocene catalyst compound. This supported catalyst is prepared by combining trimethylaluminum with a previously dried support material in an aliphatic inert suspension medium, to which water is added. This suspension can be used as such or can be filtered and the solids thus obtained can be resuspended in an aliphatic inert suspension medium, and then combined with the metallocene compound. When the reaction is complete, the supernatant solution is separated off and the solid which remains is washed once to five times with an inert suspending medium, such as toluene, n-decane, diesel oil or dichloromethane.

It would be desirable to provide a supported catalyst component, a supported catalyst, and a polymerization process that prevents or substantially reduces the problem of reactor fouling, including formation of polymer deposits on reactor walls and on the agitator in the reactor, especially in gas phase polymerization or slurry polymerization processes. Further, it is preferred that polymer products produced by gas phase polymerization or slurry polymerization processes are in free-flowing form and, advantageously, have high bulk densities.

SUMMARY OF THE INVENTION

In one aspect of the present invention, there is provided a supported catalyst component comprising a support material and an alumoxane, which component contains 15 to 40 weight percent of aluminum, based on the total weight of the support material and alumoxane, and wherein not more than about 10 percent aluminum present in the supported catalyst component is extractable in a one-hour extraction with toluene of 90° C. using about 10 mL toluene per gram of supported catalyst component, said supported catalyst component being obtainable by A. heating a support material containing alumoxane under an inert atmosphere for a period and at a temperature sufficient to fix alumoxane to the support material.

In a second aspect, there is provided a supported catalyst comprising: the supported catalyst component according to the present invention and a transition metal compound.

According to a further aspect, there is provided a process for preparing a supported catalyst component comprising:

A. heating a support material containing alumoxane under an inert atmosphere for a period and at a temperature sufficient to fix alumoxane to the support material;

thereby selecting the conditions in heating step A so as to form a supported catalyst component, which component contains 15 to 40 weight percent of aluminum, based on the total weight of the support material and alumoxane, and wherein not more than about 10 percent aluminum present in the supported catalyst component is extractable in a one-hour extraction with toluene of 90° C. using about 10 mL toluene per gram of supported catalyst component.

In another aspect, the invention provides a process for preparing a supported catalyst comprising:

A. heating a support material containing alumoxane under an inert atmosphere for a period and at a temperature sufficient to fix alumoxane to the support material; and optionally followed by B. subjecting the support material containing alumoxane to one or more wash steps to remove alumoxane not fixed to the support material;

thereby selecting the conditions in heating step A and optional washing step B so as to form a supported catalyst component, which component contains 15 to 40 weight percent of aluminum, based on the total weight of the support material and alumoxane, and wherein not more than about 10 percent aluminum present in the supported catalyst component is extractable in a one-hour extraction with toluene of 90° C. using about 10 mL toluene per gram of supported catalyst component; and adding, before or after step A or step B, a transition metal compound, with the proviso that once the transition metal compound has been added, the product thus obtained is not subjected to temperatures equal to or higher than the decomposition temperature of the transition metal compound.

In yet a further aspect, there is provided an addition polymerization process wherein one or more addition polymerizable monomers are contacted with a supported catalyst according to the present invention under addition polymerizable conditions.

DETAILED DESCRIPTION OF THE INVENTION

All references herein to elements or metals belonging to a certain Group refer to the Periodic Table of the Elements published and copyrighted by CRC Press, Inc., 1989. Also, any reference to the Group or Groups shall be to the Group or Groups as reflected in this Periodic Table of the Elements using the IUPAC system for numbering Groups. The term hydrocarbyl as employed herein means any aliphatic, cycloaliphatic, aromatic group or any combination thereof. The term hydrocarbyloxy means a hydrocarbyl group having an oxygen link between it and the element to which it is attached. Where in the specification and claims the expression "substituted cyclopentadienyl" is used, this includes ring-substituted or polynuclear derivatives of the cyclopentadienyl moiety wherein said substituent is hydrocarbyl, hydrocarbyloxy, hydrocarbylamino, cyano, halo, silyl, germyl, siloxy or mixtures thereof or two such substituents are a hydrocarbylene group, said substituent (or two substituents together) having up to 30 non-hydrogen atoms. By the term "substituted cyclopentadienyl" is specifically included indenyl, tetrahydroindenyl, fluorenyl, and octahydrofluorenyl groups.

Surprisingly, it has been found that polymers having good bulk density can be prepared in a particle forming polymerization process, without or with substantially reduced reactor fouling, by using a supported catalyst wherein the alumoxane is fixed to the support material. According to the present invention, good bulk densities, for ethylene based polymers and interpolymers, are bulk densities of at least about 0.20 g/cm$^3$, preferably of at least 0.25 g/cm$^3$, and more preferably of at least about 0.30 g/cm$^3$. It is believed that the extent of reactor fouling is related to the amount of alumoxane which leaches off the support during polymerization conditions, which may lead to active catalyst being present in the homogeneous phase, thus dissolved in the diluent, which under particle forming conditions may give very small polymer particles or polymer particles of poor morphology that may adhere to metal parts or static parts in the reactor. Further, it is believed that the bulk density of a polymer is related to the manner in which alumoxane is fixed to the support and to the amount of non-fixed alumoxane on the support, i.e. the amount of aluminum that can be extracted from the support by toluene of 90° C. The fixation of the alumoxane on the support according to the specific treatment of the present invention results in substantially no alumoxane being leached off of the support under polymerization conditions and substantially no soluble active catalyst species being present in the polymerization mixture. It has been found that the present supported catalysts can be used not only to prepare ethylene polymers and copolymers in the traditional high density polyethylene density range (0.970–0.940 g/cm$^3$) in slurry and gas phase polymerization processes, but also copolymers having densities lower than 0.940 g/cm$^3$ down to 0.880 g/cm$^3$ or lower while retaining good bulk density properties and while preventing or substantially decreasing reactor fouling.

The supported catalyst component of the present invention comprises a support material and an alumoxane wherein in general not more than about 10 percent aluminum present in the supported catalyst component is extractable in a one-hour extraction with toluene of 90° C. using about 10 mL toluene per gram of supported catalyst component. Preferably, not more than about 9 percent aluminum present in the supported catalyst component is extractable, and most preferably not more than about 8 percent. It has been found that when the amount of extractables is below these levels, a good polymer bulk density is obtained with supported catalysts based on these supported catalyst components.

The toluene extraction test is carried out as follows. About 1 g of supported catalyst component or supported catalyst, with a known aluminum content, is added to 10 mL toluene and the mixture is then heated to 90° C. under an inert atmosphere. The suspension is stirred well at this temperature for 1 hour. Then, the suspension is filtered applying reduced pressure to assist in the filtration step. The solids are washed twice with about 3 to 5 mL toluene of 90° C. per gram of solids. The solids are then dried at 120° C. for 1 hour, and subsequently the aluminum content of the solids is measured. The difference between the initial aluminum content and the aluminum content after the extraction divided by the initial aluminum content and multiplied by 100 percent, gives the amount of extractable aluminum.

The aluminum content is determined by slurrying about 0.5 g of supported catalyst component or supported catalyst in 10 mL hexane. The slurry is treated with 10–15 mL 6N sulfuric acid, followed by addition of a known excess of EDTA. The excess amount of EDTA is then back-titrated with zinc chloride.

At a level of about 10 percent extractables, the polymer bulk density obtained by polymerization using supported catalysts (components) described herein is quite sensitive with respect to small changes in the percentage of aluminum extractables. In view of the sensitivity of the polymer bulk density and the error margin in the determination of the percentage aluminum extractables (which is estimated to be 1 percent absolute), an alternative test to distinguish the supported catalyst component and supported catalyst according to the present invention is to use a supported catalyst in an ethylene polymerization process in a hydrocarbon diluent at 80° C. and 15 bar and determine the extent of reactor fouling and/or the bulk density of the ethylene polymer produced. The substantial absence of reactor fouling, i.e. substantially no polymer deposits on reactor walls or agitator, and/or bulk densities of at least 0.20 g/cm$^3$, and preferably of at least 0.25 g/cm$^3$, are characteristic of the inventive supported catalyst components and catalysts.

Support materials suitable for the present invention preferably have a surface area as determined by nitrogen porosimetry using the B.E.T. method from 10 to about 1000 m$^2$/g, and preferably from about 100 to 600 m$^2$/g. The porosity of the support advantageously is between 0.1 and 5 cm$^3$/g, preferably from about 0.1 to 3 cm$^3$/g, most preferably from 0.2 to 2 cm$^3$/g. The average particle not critical but typically from 1 to 200 μm.

Suitable support materials for the supported catalyst component of the present invention include porous resinous materials, for example, copolymers of styrene-divinylbenzene, and solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. Suitable silicas include those that are available from Grace Davison (division of W. R. Grace & Co.) under the designations SD 3216.30, Davison Syloid 245, Davison 948 and Davison 952, and from Degussa AG under the designation Aerosil 812.

Prior to its use, if desired, the support material may be subjected to a heat treatment and/or chemical treatment to reduce the water content or the hydroxyl content of the support material. Typical thermal pretreatments are carried out at a temperature from 30° C. to 1000° C. for a duration of 10 minutes to 50 hours in an inert atmosphere or under reduced pressure.

The supported catalyst component further comprises an alumoxane component. An alumoxane (also referred to as aluminoxane) is an oligomeric or polymeric aluminum oxy compound containing chains of alternating aluminum and oxygen atoms, whereby the aluminum carries a substituent, preferably an alkyl group. The exact structure of alumoxane is not known, but is generally believed to be represented by the following general formulae (—Ai(R)—O)$^m$, for a cyclic alumoxane, and R$_2$Al—O(—Al(R)—O)$_m$—AlR$_2$, for a linear compound, wherein R independently each occurrence is a C$_1$–C$_{10}$ hydrocarbyl, preferably alkyl, or halide and m is an integer ranging from 1 to about 50, preferably at least about 4. Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutyl aluminum, with water yields so-called modified or mixed alumoxanes. Preferred alumoxanes are methylalumoxane and methylalumoxane modified with minor amounts of other lower alkyl groups such as isobutyl. Alumoxanes generally contain minor to substantial amounts of starting aluminum alkyl compound.

The way in which the alumoxane is prepared is not critical for the present invention. When prepared by the reaction between water and aluminum alkyl, the water may be combined with the aluminum alkyl in various forms, such as liquid, vapor, or solid, for example, in the form of water of crystallization. Particular techniques for the preparation of alumoxane-type compounds by contacting an aluminum alkyl compound with an inorganic salt containing water of crystallization are disclosed in U.S. Pat. No. 4,542,199. In a particular preferred embodiment, an aluminum alkyl compound is contacted with a regeneratable water-containing substance such as hydrated alumina, silica or other substance. This is disclosed in European Patent Application No. 338,044.

The supported catalyst component of the present invention generally contains 15 to 40 weight percent, preferably from 20 to 40 weight percent, and more preferably from 25 to 40 weight percent of aluminum, based on the total weight of the support material and alumoxane. Amounts of aluminum of at least 15 weight percent, preferably at least 20 weight percent, and most preferably at least 25 weight percent are advantageous because these enable the deposit of relatively high amounts of transition metal compound on the support and thereby enable a relatively high activity to be obtained. This improves the overall catalyst efficiency, especially when expressed on the basis of the support material.

The supported catalyst component as such or slurried in a diluent can be stored or shipped under inert conditions, or can be used to generate the supported catalyst of the present invention.

According to a further aspect, the present invention provides a supported catalyst comprising the supported catalyst component according to the present invention and a transition metal compound, preferably a transition metal compound containing at least one cyclic or non-cyclic Π-bonded anionic ligand group, preferably a cyclopentadienyl or substituted cyclopentadienyl moiety. Suitable complexes are derivatives of any transition metal including Lanthanides, but preferably of Group 3, 4, 5, or Lanthanide metals which are in the +2, +3, or +4 formal oxidation state. Preferred compounds include metal complexes containing from 1 to 3 Π-bonded anionic ligand groups, which may be cyclic or non-cyclic delocalized Π-bonded anionic ligand groups. Exemplary of such Π-bonded anionic ligand groups are conjugated or nonconjugated, cyclic or non-cyclic dienyl groups, allyl groups, and arene groups. By the term "Π-bonded" is meant that the ligand group is bonded to the transition metal by means of a Π bond. Each atom in the delocalized Π-bonded group may independently be substituted with a radical selected from the group consisting of halogen, hydrocarbyl, halohydrocarbyl, and hydrocarbyl-substituted metalloid radicals wherein the metalloid is selected from Group 14 of the Periodic Table of the Elements. Included within the term hydrocarbyl are preferably $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition, two or more such radicals may together form a fused ring system or a hydrogenated fused ring system. Suitable hydrocarbyl-substituted organometalloid radicals include mono-, di- and trisubstituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups.

Examples of suitable anionic, delocalized Π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted derivatives thereof. Preferred anionic delocalized Π-bonded groups are cyclopentadienyl, pentamethylcyclopentadienyl, tetramethylcyclopentadienyl, indenyl, 2,3-dimethylindenyl, fluorenyl, 2-methylindenyl and 2-methyl-4-phenylindenyl.

The term metallocene compound as used herein refers to transition metal compounds containing a derivative of a cyclopentadienyl moiety. Suitable metallocenes for use in the present invention are the bridged or unbridged mono-, bis-, and tricyclopentadienyl or substituted cyclopentadienyl transition metal compounds.

Suitable unbridged monocyclopentadienyl or mono (substituted cyclopentadienyl) transition metal derivatives are represented by the general formula $CpMX_n$ wherein Cp is cyclopentadienyl or a derivative thereof; M is a Group 3, 4, or 5 transition metal having a formal oxidation state of 2, 3 or 4; X independently each occurrence represents an anionic ligand group (other than a cyclic, aromatic Π-bonded anionic ligand group), said X having up to 50 non-hydrogen atoms; and n, a number equal to one less than the formal oxidation state of M, is 1, 2 or 3, preferably 3. Exemplary of such ligand groups X are hydrocarbyl, hydrocarbyloxy, hydride, halo, silyl, germyl, amide, and siloxy or two X groups together may form a hydrocarbylene (including hydrocarbylidene).

Suitable bridged monocyclopentadienyl or mono (substituted cyclopentadienyl) transition metal compounds include the well-known constrained geometry complexes. Examples of such complexes and methods for their preparation are disclosed in U.S. application Ser. No. 545,403, filed Jul. 3, 1990 (corresponding to EP-A-416,815), U.S. Pat. No. 5,374,696 (corresponding to WO-93/19104), as well as U.S. Pat. Nos. 5,055,438, 5,057,475, 5,096,867, 5,064,802 and 5,132,380, all of which are incorporated by reference.

More particularly, preferred bridged monocyclopentadienyl or mono(substituted cyclopentadienyl) transition metal compounds correspond to the Formula I:

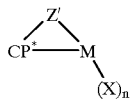

wherein:

M is a metal of Group 3–5, especially a Group 4 metal, particularly titanium;

Cp* is a substituted cyclopentadienyl group bound to Z' and, in an $\eta^5$ bonding mode, to M or such a group is further substituted with from one to four substituents selected from the group consisting of hydrocarbyl, silyl, germyl, halo, hydrocarbyloxy, amino, and mixtures thereof, said substituent having up to 20 non-hydrogen atoms, or optionally, two such further substituents (except halo or amino) together cause Cp* to have a fused ring structure;

Z' is a divalent moiety other than a cyclic or non-cyclic π-bonded anionic ligand, said Z' comprising boron, or a member of Group 14 of the Periodic Table of the Elements, and optionally nitrogen, phosphorus, sulfur or oxygen, said moiety having up to 20 non-hydrogen atoms, and optionally Cp* and Z' together form a fused ring system;

X independently each occurrence is an anionic ligand group (other than a cyclic π-bonded group) having up to 50 non-hydrogen atoms; and n is 1 or 2 depending on the valence of M.

In consonance with the previous explanation, M is preferably a Group 4 metal, especially titanium; n is 1 or 2; and X is a monovalent ligand group of up to 30 non-hydrogen atoms, more preferably, $C_{1-20}$ hydrocarbyl.

When n is 1 and the Group 3–5 metal (preferably the Group 4 metal) is in the +3 formal oxidation state, X is preferably a stabilizing ligand.

By the term "stabilizing ligand" is meant that the ligand group stabilizes the metal complex through either:

1) a nitrogen, phosphorus, oxygen or sulfur chelating bond, or 2) an $\eta^3$ bond with a resonant, delocalized π-electronic structure.

Examples of stabilizing ligands of Group 1 include silyl, hydrocarbyl, amido or phosphido ligands substituted with one or more aliphatic or aromatic ether, thioether, amine or phosphine functional groups, especially such amine or phosphine groups that are tertiary substituted, said stabilizing ligand having from 3 to 30 non-hydrogen atoms. Most preferred Group 1 stabilizing ligands are 2-dialkylaminobenzyl or 2-(dialkylaminomethyl)phenyl groups containing from 1 to 4 carbons in the alkyl groups.

Examples of stabilizing ligands of Group 2 include $C_{3-10}$ hydrocarbyl groups containing ethylenic unsaturation, such as allyl, 1-methylallyl, 2-methylallyl, 1,1-dimethylallyl, or 1,2,3-trimethylallyl groups.

More preferably still, such metal coordination complexes correspond to the Formula II:

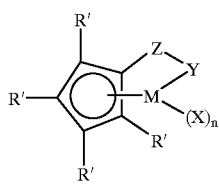

II wherein R' each occurrence is independently selected from the group consisting of hydrogen, hydrocarbyl silyl, germyl, cyano, halo and combinations thereof having up to 20 non-hydrogen atoms, or two R' groups (except cyano or halo) together form a divalent derivative thereof;

X each occurrence independently is selected from the group consisting of hydride, halo, alkyl, aryl, silyl, germyl, aryloxy, alkoxy, amide, siloxy, and combinations thereof having up to 20 non-hydrogen atoms;

Y is a divalent anionic ligand group comprising nitrogen, phosphorus, oxygen or sulfur and having up to 20 non-hydrogen atoms, said Y being bonded to Z and M through said nitrogen, phosphorus, oxygen or sulfur, and optionally Y and Z together form a fused ring system;

M is a Group 4 metal, especially titanium;

Z is $SiR^*_2$, $CR^*_2$, $SiR^*_2SiR^*_2$, $CR^*_2CR^*_2$, $CR^*=CR^*$, $CR^*_2SiR^*_2$, $GeR^*_2$, $BR^*$, or $BR^*_2$; wherein:

R* each occurrence is independently selected from the group consisting of hydrogen, hydrocarbyl, silyl, halogenated alkyl, halogenated aryl groups having up to 20 non-hydrogen atoms, and mixtures thereof, or two or more R* groups from Z, or an R* group from Z together with Y form a fused ring system; and n is 1 or 2.

Further more preferably, Y is —O—, —S—, —NR*—, —PR*—. Highly preferably, Y is a nitrogen or phosphorus containing group corresponding to the formula —N(R')— or —P(R')—, wherein R' is as previously described, i.e., an amido or phosphido group.

Most highly preferred metal coordination complexes correspond to the Formula III:

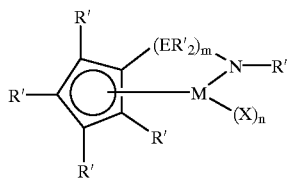

III wherein:

M is titanium;

R' each occurrence is independently selected from the group consisting of hydrogen, silyl, hydrocarbyl and combinations thereof having up to 20, preferably up to 10 carbon or silicon atoms, or two R' groups of the substituted cyclopentadienyl moiety are joined together;

E is silicon or carbon;

X independently each occurrence is hydride, halo, alkyl, aryl, aryloxy or alkoxy of up to 10 carbons;

m is 1 or 2; and n is 1 or 2.

Examples of the above most highly preferred metal coordination compounds include compounds wherein the R' on the amido group is methyl, ethyl, propyl, butyl, pentyl, hexyl (including isomers), norbornyl, benzyl, phenyl, cyclododecyl, etc.; $(ER'_2)_m$ is dimethyl silane or 1,2-ethylene; R' on the cyclic Π-bound group independently each occurrence is hydrogen, methyl, ethyl, propyl, butyl, pentyl, hexyl, norbornyl, benzyl, phenyl, etc. or two R' groups are joined forming an indenyl, tetrahydroindenyl, fluorenyl or octahydrofluorenyl moiety; and X is chloro, bromo, iodo, methyl, ethyl, propyl, butyl, pentyl, hexyl, norbornyl, benzyl, phenyl, etc.

Specific highly preferred compounds include: (tert-butylamido)(tetramethyl-$\eta^5$-cyclopentadienyl)-1,2-ethanediyltitanium dimethyl, (tert-butylam ido)(tetramethyl-$\eta^5$-cyclopentadienyl)-1,2-ethanediyltitanium dibenzyl, (tert-butylamido)(tetramethyl-$\eta^5$-cyclopentadienyl) dimethylsilanetitanium dimethyl, (tert-buty lamido)(tetramethyl-$\eta^5$-cyclopentadienyl) dimethylsilanetitanium dibenzyl, (methylamido)(tetramethyl-$\eta^5$-cyclopentadienyl)dimethylsilanetitanium dimethyl, (methylamido)(tetramethyl-$\eta^5$-cyclopentadienyl) dimethylsilanetitanium dibenzyl, (phenylamido) (tetramethyl-$\eta^5$-cyclopentadienyl)dimethylsilanetitanium dimethyl, (phenylamido)(tetramethyl-$\eta^5$-cyclopentadienyl) dimethylsilanetitanium dibenzyl, (benzylamido) (tetramethyl-$\eta^5$-cyclopentadienyl)dimethylsilanetitanium dimethyl, (benzylamido)(tetramethyl-$\eta^5$-cyclopentadienyl) dimethylsilanetitanium dibenzyl, (tert-butylamido) ($\eta^5$-cyclopentadienyl)-1,2-ethanediyltitanium dimethyl, (tert-butylamido) ($\eta^5$-cyclopentadienyl)-1,2-ethanediyltitanium dibenzyl, (tert-butylamido) ($\eta^5$-cyclopentadienyl) dimethylsilanetitanium dimethyl, (tert-butylamido)($\eta^5$-cyclopentadienyl) dimethylsilanetitanium dibenzyl, (methylamido) ($\eta^5$-cyclopentadienyl) dimethylsilanetitanium dimethyl, (t-butylamido)($\eta^5$-cyclopentadienyl) dimethylsilanetitanium dibenzyl, (t-butylamido) indenyldimethylsilanetitanium dimethyl, (t-butylamido) indenyldimethylsilanetitanium dibenzyl, (benzylamido) indenyldimethylsilanetitanium dibenzyl; and the corresponding zirconium or hafnium coordination complexes.

Transition metal compounds wherein the transition metal is in the +2 formal oxidation state and processes for their preparation are disclosed in detail in WO 9500526 which corresponds to U.S. application Ser. No. 241,523, filed May 12, 1994. Suitable complexes include those containing one, and only one, cyclic, delocalized, anionic, Π-bonded group, said complexes corresponding to the Formula IV:

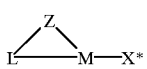

IV wherein:

M is titanium or zirconium in the +2 formal oxidation state;

L is a group containing a cyclic, delocalized, anionic, Π-system through which the group is bound to M, and which group is also bound to Z;

Z is a moiety bound to M via a σ-bond, comprising boron, or a member of Group 14 of the Periodic Table of the Elements, and also comprising nitrogen, phosphorus, sulfur or oxygen, said moiety having up to 60 non-hydrogen atoms; and X* is a neutral, conjugated or non-conjugated diene, optionally substituted with one or more hydrocarbyl groups, said X having up to 40 carbon atoms and forming a Π-complex with M.

Preferred transition metal compounds of Formula IV include those wherein Z, M and X* are as previously defined; and L is a CH₅H₄ group bound to Z and bound in an η⁵ bonding mode to M or is such an η⁵ bound group substituted with from one to four substituents independently selected from hydrocarbyl, silyl, germyl, halo, cyano, and combinations thereof, said substituent having up to 20 non-hydrogen atoms, and optionally, two such substituents (except cyano or halo) together cause L to have a fused ring structure.

More preferred transition metal +2 compounds according to the present invention correspond to the Formula V:

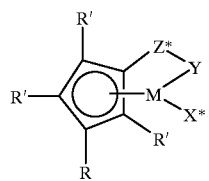

V wherein:
R' each occurrence is independently selected from hydrogen, hydrocarbyl, silyl, germyl, halo, cyano, and combinations thereof, said R' having up to 20 non-hydrogen atoms, and optionally, two R' groups (where R' is not hydrogen, halo or cyano) together form a divalent derivative thereof connected to adjacent positions of the cyclopentadienyl ring to form a fused ring structure;

X* is a neutral η⁴-bonded diene group having up to 30 non-hydrogen atoms, which forms a Π-complex with M;

Y is —O—, —S-, —NR*—, —PR*—;

M is titanium or zirconium in the +2 formal oxidation state; and

Z* is SiR*₂, CR*₂, SiR*₂, SiR*₂, CR*₂CR*₂, CR*=CR*, CR*₂SiR*₂, or GeR*₂; wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Preferably, R' independently each occurrence is hydrogen, hydrocarbyl, silyl, halo and combinations thereof said R' having up to 10 non-hydrogen atoms, or two R' groups (when R' is not hydrogen or halo) together form a divalent derivative thereof; most preferably, R' is hydrogen, methyl, ethyl, propyl, butyl, pentyl, hexyl, (including where appropriate all isomers), cyclopentyl, cyclohexyl, norbornyl, benzyl, or phenyl or two R' groups (except hydrogen) are linked together, the entire C,R'₄ group thereby being, for example, an indenyl, tetrahydroindenyl, fluorenyl, tetrahydro-fluorenyl, or octahydrofluorenyl group.

Further preferably, at least one of R' or R* is an electron donating moiety. By the term "electron donating" is meant that the moiety is more electron donating than hydrogen. Thus, highly preferably Y is a nitrogen or phosphorus containing group corresponding to the formula —N(R")— or —P(R")—, wherein R" is $C_{1-20}$, preferably $C_{1-10}$ hydrocarbyl.

Examples of suitable X* groups include: s-trans-η⁴-1,4-diphenyl-1,3-butadiene; s-trans-η⁴-3-methyl-1,3-pentadiene; s-trans-η⁴-1,4-dibenzyl-1,3-butadiene; s-trans-η⁴-2,4hexadiene; s-trans-η⁴-1,3-pentadiene; s-trans-η⁴-1,4-ditolyl-1,3-butadiene; s-trans-η⁴-1,4-bis(trimethylsilyl)-1,3-butadiene; s-cis-η⁴-1,4-diphenyl-1,3-butadiene; s-cis-η⁴-3-methyl-1,3-pentadiene; s-cis-η⁴-dibenzyl-1,3-butadiene; s-cis-η⁴-2,4-hexadiene; s-cis-η⁴-1,3-pentadiene; s-cis-η⁴-1,4-ditolyl-1,3-butadiene; and s-cis-η⁴-1,4-bis(trimethylsilyl)-1,3-butadiene, said s-cis diene group forming a Π-complex as defined herein with the metal.

Most highly preferred transition metal +2 compounds are amidosilane- or amidoalkanediyl-compounds of Formula V wherein:
—Z*—Y— is —(ER'''₂)ₘ—N(R")—, and R' each occurrence is independently selected from hydrogen, silyl, hydrocarbyl and combinations thereof, said R' having up to 10 carbon or silicon atoms, or two such R' groups on the substituted cyclopentadienyl group (when R' is not hydrogen) together form a divalent derivative thereof connected to adjacent positions of the cyclopentadienyl ring;

R" is $C_{1-10}$ hydrocarbyl;

R''' is independently each occurrence hydrogen or $C_{1-10}$ hydrocarbyl;

E is independently each occurrence silicon or carbon; and m is 1 or 2.

Examples of the metal complexes according to the present invention include compounds wherein R" is methyl, ethyl, propyl, butyl, pentyl, hexyl (including all isomers of the foregoing where applicable), cyclododecyl, norbornyl, benzyl, or phenyl; (ER'''₂)ₘ is dimethylsilane, or ethanediyl; and the cyclic delocalized Π-bonded group is cyclopentadienyl, tetramethylcyclopentadienyl, indenyl, tetrahydroindenyl, fluorenyl, tetrahydrofluorenyl or octahydrofluorenyl.

Suitable bis-cyclopentadienyl or substituted cyclopentadienyl transition metal compounds include those containing a bridging group linking the cyclopentadienyl groups and those without such bridging groups.

Suitable unbridged bis-cyclopentadienyl or bis (substituted cyclopentadienyl) transition metal derivatives are represented by the general formula Cp₂MXₙ, wherein Cp is a Π-bound cyclopentadienyl group or a Π-bound substituted cyclopentadienyl group, and M and X are as defined with respect to Formula II, and n' is 1 or 2 and is two less than the formal oxidation state of M. Preferably, n' is 2. Exemplary of the unbridged biscyclopentadienyl transition metal derivatives are: biscyclopentadienyl zirconium dimethyl, biscyclopentadienyl zirconium dibenzyl, bis (methylcyclopentadienyl) zirconium dimethyl, bis(n-butyl cyclopentadienyl) zirconium dimethyl, bis(t-butylcyclopentadienyl) zirconium dimethyl, bis (pentamethylcyclopentadienyl) zirconium dimethyl, bis (indenyl) zirconium dibenzyl, bis(fluorenyl) zirconium dimethyl, bis(pentamethylcyclopentadienyl) zirconium bis [2-(N,N-dimethylamino)benzyl], and corresponding titanium and hafnium derivatives.

Preferred bridging groups are those corresponding to the formula (ER"₂), wherein E is silicon or carbon, R" independently each occurrence is hydrogen or a group selected from silyl, hydrocarbyl and combinations thereof, said R" having up to 30 carbon or silicon atoms, and x is 1 to 8. Preferably R" independently each occurrence is methyl, benzyl, tert-butyl, or phenyl.

Exemplary bridged ligands containing two Π-bonded groups are: (dimethylsilyl-bis-cyclopentadienyl), (dimethylsilyl-bis-methylcyclopentadienyl), (dimethylsilyl-bis-ethylcyclopentadienyl), (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1,1,2,2-tetramethyl-1,2-disilyl-bis-cyclopentadienyl), (1,2-bis(cyclopentadienyl) ethane, and (isopropylidene-cyclopentadienyl-fluorenyl).

Examples of the foregoing bridged biscyclopentadienyl or bis(substituted cyclopentadienyl) complexes are compounds corresponding to the Formula VI:

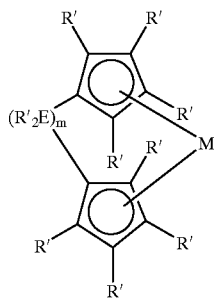

VI wherein:

M, X, E, R', m, and n are as defined for the complexes of Formula III. Two of the substituents X together may form a neutral Π-bonded conjugated diene having from 4 to 30 non-hydrogen atoms forming a Π-complex with M, whereupon M, preferably being zirconium or hafnium, is in the +2 formal oxidation state.

The foregoing metal complexes are especially suited for the preparation of polymers having stereoregular molecular structure. In such capacity, it is preferred that the complex possess Cs symmetry or possess a chiral, stereorigid structure. Examples of the first type are compounds possessing different delocalized p-bonded systems, such as one cyclopentadienyl group and one fluorenyl group. Similar systems based on Ti(IV) or Zr(IV) were disclosed for preparation of syndiotactic olefin polymers in Ewen et al., *J. Am. Chem. Soc.*, Vol. 110, pp. 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem.*, Vol. 232, pp. 233–47, (1982).

Exemplary complexes of Formula IV are: (dimethylsilyl-bis-cyclopentadienyl) zirconium dimethyl, (dimethylsilyl-bis-tetramethylcyclopentadienyl) zirconium dimethyl, (dimethylsilyl-bis-t-butylcyclopentadienyl) zirconium diphenyl, (dimethylsilyl-bis-tetramethylcyclopentadienyl) zirconium dibenzyl, (dimethylsilyl-bis-indenyl) zirconium bis(2-dimethylaminobenzyl), (isopropylidene-cyclopentadienyl-fluorenyl) zirconium dimethyl, [2,2'-biphenyldiylbis(3,4-dimethyl-1-cyclopentadienyl)] titanium dibenzyl, [6,6-dimethyl-2,2'biphenyl-bis(3,4-dimethyl-1-cyclopentadienyl)] zirconium dimethyl, and corresponding titanium and hafnium complexes.

Suitable tricyclopentadienyl or substituted cyclopentadienyl transition metal compounds include those containing a bridging group linking two cyclopentadienyl groups and those without such bridging groups.

Suitable unbridged tricyclopentadienyl transition metal derivatives are represented by general formula $Cp_3MX_{n''}$ wherein Cp, M and X are as previously defined and n" is three less than the formal oxidation state of M and is 0 or 1, preferably 1. Preferred ligand groups X are hydrocarbyl, hydrocarbyloxy, hydride, halo, silyl, germyl, amido, and siloxy.

Preferably, the transition metal compound is a bridged monocyclopentadienyl Group 4 transition metal compound or a bridged biscyclopentadienyl Group 4 transition metal compound, more preferably a bridged monocyclopentadienyl transition metal compound, especially such a compound wherein the metal is titanium.

Other compounds which are useful in the preparation of catalyst compositions according to this invention, especially compounds containing other Group 4 metals, will, of course, be apparent to those skilled in the art.

Generally, the aluminum atom (from the alumoxane component) to transition metal atom mole ratio in the supported catalyst is from 1 to 5000, preferably from 25 to 1000 and most preferably from 50 to 500. At too low ratios, the supported catalyst will not be very active, whereas at too high ratios, the catalyst becomes less economic due to the relatively high cost associated with the use of large quantities of alumoxane.

The quantity of transition metal compound in the supported catalyst of the present invention is not critical, but typically ranges from 0.1 to 1000 micromoles of transition metal compound per gram of support material. Preferably, the supported catalyst contains from 1 to 250 micromoles of transition metal compound per gram of support material. It has been found that increased aluminum loadings on the support result in catalysts having higher efficiencies, when expressed on a transition metal basis, compared to catalysts having lower aluminum loadings but about the same aluminum/transition metal ratio. These higher aluminum loaded support components also provide supported catalysts having higher efficiencies, when expressed based on aluminum or support material.

The supported catalyst of the present invention can be used as such or in prepolymerized form obtained by subjecting an olefin, in the presence of the supported catalyst, to polymerization conditions.

The supported catalyst component of the invention is obtainable by heating a support material containing alumoxane under an inert atmosphere for a period and at a temperature sufficient to fix alumoxane to the support material.

The support material containing alumoxane can be obtained by combining in a diluent an alumoxane with a support material containing from 0 to not more than 20 weight percent of water, preferably from 0 to not more than 6 weight percent of water, based on the total weight of support material and water. Support materials containing substantially no water give good results with respect to catalytic properties of the supported catalyst. In addition, it has been found that support materials containing relatively small amounts of water can be used without problem in the present process. The water containing support materials, when combined under identical conditions with the same amount of alumoxane, gives, in the present process, a supported catalyst component having a slightly higher aluminum content than the substantially water-free support material. It is believed that the water reacts with the residual amounts of aluminum alkyl present in the alumoxane to convert the aluminum alkyl to extra alumoxane. An additional advantage is that, in this way, less aluminum alkyl will be lost to waste or recycle streams. The alumoxane desirably is used in a dissolved form.

Alternatively, the support material containing alumoxane may be obtained by combining in a diluent a support material containing from 2, preferably from 5 to 30 weight percent water, more preferably from 6 to 20 weight percent water, based on the total weight of support material and water, with a compound of the formula $R''_{n*}AlX''_{3-n*}$ wherein R" independently each occurrence is a hydrocarbyl radical, X" is halogen or hydrocarbyloxy, and n* is an integer from 1 to 3. Preferably, n* is 3. When the alumoxane is prepared in situ by reacting the compound of the formula $R''_{n^*}AlX''_{3-n}$ with water, the mole ratio of $R''_{n^*}AlX''_{3-n^*}$ to water is typically 10:1 to 1:1, preferably from 5:1 to 1:1.

The support material is added to the alumoxane or compound of the formula $R''_{n^*}AlX''_{3-n^*}$, preferably dissolved in a solvent, most preferably a hydrocarbon solvent, or the solution of alumoxane or compound of the formula $R''_{n^*}AlX''_{3-n^*}$ is added to the support material. The support material can be used as such in dry form or slurried in a hydrocarbon diluent. Both aliphatic and aromatic hydrocarbons can be used. Suitable aliphatic hydrocarbons include, for example, pentane, isopentane, hexane, heptane, octane, iso-octane, nonane, isononane, decane, cyclohexane, methyl- cyclohexane and combinations of two or more of such diluents. Suitable examples of aromatic diluents are benzene, toluene, xylene, and other alkyl or halogen substituted aromatic compounds. Most preferably, the diluent is an aromatic hydrocarbon, especially toluene. Suitable concentrations of solid support in the hydrocarbon medium range from about 0.1 to about 15, preferably from about 0.5 to about 10, more preferably from about 1 to about 7 weight percent. The contact time and temperature are not critical. Preferably, the temperature is from 0° C. to 60° C., more preferably from 10° C. to 40° C. The contact time is from 15 minutes to 40 hours, preferably from 1 hour to 20 hours.

Before subjecting the support material containing alumoxane to the heating step, the diluent or solvent is removed to obtain a free-flowing powder. This is preferably done by applying a technique which only removes the liquid and leaves the aluminum compounds on the solid, such as by applying heat, reduced pressure, evaporation, or combinations of such techniques.

The heating step A followed by the optional washing step B is conducted in such a way that a very large proportion (more than about 90 percent by weight) of the alumoxane which remains on the supported catalyst component is fixed. In the heating step, the alumoxane is fixed to the support material, whereas in the optional washing step, the alumoxane which is not fixed is removed to a substantial degree to provide the supported catalyst component of the present invention. The upper temperature for the heat treatment is preferably below the temperature at which the support material begins to agglomerate and form lumps which are difficult to redisperse, and below the alumoxane decomposition temperature. When the metallocene compound is added before the heat treatment, as will be explained herein, the heating temperature should be below the decomposition temperature of the metallocene compound. The support material containing alumoxane in free-flowing or powder form, is preferably subjected to a heat treatment at a temperature from at least 75° C., preferably at least 85° C., more preferably at least 100° C., up to 250° C., more preferably up to 200° C for a period from 15 minutes to 72 hours, preferably up to 24 hours. More preferably, the heat treatment is carried out at a temperature from 160° C. to 200° C. for a period from 30 minutes to 4 hours. Good results have been obtained while heating for 8 hours at 100° C. as well as while heating for 2 hours at 175° C. By means of preliminary experiments, a person skilled in the art will be able to define the heat treatment conditions that will provide the desired result. It is noted that the longer the heat treatment takes, the higher the amount of alumoxane fixed to the support material will be. The heat treatment is carried out at reduced pressure or under an inert atmosphere, such as nitrogen gas, but preferably at reduced pressure. Depending on the conditions in the heating step, the alumoxane may be fixed to the support material to such a high degree that a wash step may be omitted.

In the optional wash step B, the number of washes and the solvent used are such that amounts of non-fixed alumoxane are removed sufficient to give the supported catalyst component of the invention. The washing conditions should be such that non-fixed alumoxane is soluble in the wash solvent. The support material containing alumoxane, already subjected to a heat treatment, is preferably subjected to one to five wash steps using an aromatic hydrocarbon solvent at a temperature from 0° C. to 110° C. More preferably, the temperature is from 20° C. to 1 00° C. Preferred examples of aromatic solvents include toluene, benzene and xylenes. More preferably, the aromatic hydrocarbon solvent is toluene. At the end of the wash treatment, the solvent is removed by a technique that also removes the alumoxane dissolved in the solvent, such as by filtration or decantation. Preferably, the wash solvent is removed to provide a free-flowing powder of the supported catalyst component.

The wash step advantageously can be carried out under conditions of refluxing the wash solvent. The wash step under refluxing conditions allows control of the particle size distribution properties, preferably to give a distribution similar to that of the starting support material, and has also been found to give a supported catalyst having increased polymerization activity. Typically, the supported catalyst component, after the heating step, is slurried in an aromatic hydrocarbon, and the slurry is refluxed or heated at the boiling point of the aromatic hydrocarbon. The slurry is kept at these refluxing conditions for 5 minutes up to 72 hours. Any agglomerated particles that may have been formed during the heating step will be deagglomerated or dispersed during the wash step at reflux condition. The longer the refluxing conditions are maintained, the better dispersion is obtained. The concentration of supported catalyst component in the aromatic hydrocarbon is not critical, but is typically in the range of 1 to 500 g, per liter hydrocarbon, preferably from 10 to 250 g per liter. Preferred examples of aromatic hydrocarbons include toluene, benzene and xylenes. More preferably, the aromatic hydrocarbon solvent is toluene. During the reflux step, agitation can be applied.

The supported catalyst component of the present invention, after the wash or reflux steps described above, is preferably subjected to a dispersion treatment before combining the supported catalyst component with the transition metal compound, This has been found to increase the catalytic activity of the final supported catalyst. In general, a hydrocarbon is used as a dispersing medium, such as aliphatic, cycloaliphatic or aromatic hydrocarbons. Suitable examples are aliphatic hydrocarbons of 6–20 carbon atoms, preferably of 6–10 carbon atoms or mixtures thereof. The temperature is not critical but is conveniently in the range from 0° C. to 50° C. The duration is generally at least 5 minutes to up to 72 hours . The upper limit is not critical but determined by practical considerations.

The transition metal compound is preferably added after the heating step, and more preferably after both the heating step and the optional washing and dispersion steps. If the transition metal compound is added before either of these steps, care should be taken not to submit the transition metal to too high temperatures which may cause decomposition or inactivation thereof. Advantageously, the transition metal compound is added after the washing step in order to avoid that the transition metal is washed off the support material together with alumoxane.

The transition metal is contacted with the support material containing alumoxane, and preferably with the supported catalyst component of the present invention, in a diluent, preferably under such conditions that the transition metal compound is soluble. Suitable diluents include aliphatic and aromatic hydrocarbons, preferably an aliphatic hydrocarbon such as, for example, hexane. The metallocene is preferably added to a slurry of the support material, advantageously dissolved in the same diluent in which the support material is slurried. Generally, the support material containing alumoxane is slurried in the diluent at concentrations from about 1 to about 20, preferably from about 2 to about 10 weight percent. The contact time and temperature are not critical. Preferably, the temperature is from 10° C. to 60° C., more preferably from 20° C. to 45° C. Th e contact time is from 5 minutes to 100 hours, preferably from 0.5 hour to 3 hours. Typically, the diluent is removed after adding the metallocene. This can be done by any suitable technique, such as applying heat and/or reduced pressure, evaporation, filtration or decantation, or any combination thereof. If heat is applied, the temperature should not exceed the decomposition temperature of the metallocene.

It can be advantageous to subject an olefin in the presence of the supported catalyst to polymerization conditions to provide a prepolymerized supported catalyst.

In a highly preferred embodiment, the process for preparing a supported catalyst comprises:

heating at a temperature from 75° C. to 250° C. under an inert atmosphere, preferably under reduced pressure, a silica support material containing methylalumoxane;

optionally followed by subjecting the product of the heating step to one or more wash steps using toluene;

thereby selecting the conditions in the heating step and washing step so as to form a supported catalyst component wherein not more than about 9 percent aluminum present in the supported catalyst component is extractable in a one-hour extraction with toluene of 90° C. using about 1 g of supported catalyst component per 10 mL toluene; and adding, after the heating step and optional washing step, a transition metal compound selected from the group consisting of a bridged monocyclopentadienyl or mono (substituted cyclopentadienyl) Group 4 transition metal compounds or bridged biscyclopentadienyl or bis (substituted cyclopentadienyl) Group 4 transition metal compounds, with the proviso that once the transition metal compound has been added, the product thus obtained is not subjected to temperatures equal to or higher than its decomposition temperature.

Preferably, the supported catalyst so prepared contains 20 to 40 weight percent of aluminum, based on the total weight of the support material and alumoxane. Advantageously, the aluminum atom to transition metal atom mole ratio in the supported catalyst thus formed is from 25 to 1000. Preferably, the supported catalyst so formed contains from 0.1 to 1000 micromoles of transition metal compound per gram of support material.

The supported catalyst thus obtained may be employed as such, without isolation or purification, but is preferably first recovered in the form of free-flowing particles. The isolated catalyst can be stored under inert atmosphere for an extended period of time, for example for one to several months. Prior to its use, the supported catalyst can be easily reslurried in a diluent, preferably a hydrocarbon. The present supported catalyst does not require additional activators or cocatalysts.

In a further aspect, the present invention provides an addition polymerization process wherein one or more addition polymerizable monomers are contacted with the supported catalyst according to the invention, under addition polymerization conditions.

Suitable addition polymerizable monomers include ethylenically unsaturated monomers, acetylenic compounds, conjugated or non-conjugated dienes, polyenes, and carbon monoxide. Preferred monomers include olefins, for example, alpha-olefins having from 2 to about 20, preferably from about 2 to about 12, more preferably from about 2 to about 8 carbon atoms and combinations of two or more of such alpha-olefins. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene, or combinations thereof. Preferably, the alpha-olefins are ethylene, propene, 1-butene, 4-methyl-pentene-1,1-hexene, 1-octene, and combinations of ethylene and/or propene with one or more of such other alpha-olefins. Other preferred monomers include styrene, halo- or alkyl substituted styrenes, vinyl chloride, acrylonitrile, methyl acrylate, methyl methacrylate, tetrafluoroethylene, methacrylonitrile, vinylidene chloride, vinylcyclobutene, 1,4-hexadiene, and 1,7-octadiene. Suitable addition polymerizable monomers also include any mixtures of the above-mentioned monomers.

The supported catalyst can be formed in situ in the polymerization mixture by introducing into said mixture both a supported catalyst component of the present invention as well as a suitable metallocene component. The supported catalyst component and the supported catalyst of the present invention can be advantageously employed in a high pressure, solution, slurry or gas phase polymerization process. A high pressure process is usually carried out at temperatures from 100° C. to 400° C. and at pressures above 500 bar. A slurry process typically uses an inert hydrocarbon diluent and temperatures of from about 0° C. up to a temperature just below the temperature at which the resulting polymer becomes substantially soluble in the inert polymerization medium. Preferred temperatures are from about 20° C. to about 115° C., preferably from about 60° C. to about 105° C. The solution process is carried out at temperatures from the temperature at which the resulting polymer is soluble in an inert solvent up to about 275° C. Generally, solubility of the polymer depends on its density. For ethylene copolymers having densities of 0.86 g/cm$^3$, solution polymerization may be achieved at temperatures as low as about 60° C. Preferably, solution polymerization temperatures range from about 75° C. to about 260° C., more preferably from about 80° C. to about 170° C. As inert solvents, typically hydrocarbons and preferably aliphatic hydrocarbons are used. The solution and slurry processes are usually carried out at pressures between about 1 to 100 bar. Typical operating conditions for gas phase polymerizations are from 20° C. to 100° C., more preferably from 40° C. to 80° C. In gas phase processes, the pressure is typically from subatmospheric to 100 bar. Typical gas phase polymerization processes are disclosed in U.S. Pat. Nos. 4,588,790, 4,543,399, 5,352,749, 5,405,922, and U.S. application Ser. No. 122,582, filed Sep. 17, 1993 (corresponding to WO 9507942) which are hereby incorporated by reference.

Preferably, for use in gas phase polymerization processes, the support has a median particle diameter from about 20 to about 200 μm, more preferably from about 30 μm to about 150 μm, and most preferably from about 35 μm to about 100 μm. Preferably for use in slurry polymerization processes, the support has a median particle diameter from about 1 to about 200 μm, more preferably from about 5 μm to about 100 μm, and most preferably from about 20 μm to about 80 μm. Preferably, for use in solution or high pressure polymerization processes, the support has a median particle diameter from about 1 to about 40 μm, more preferably from about 2 μm to about 30 μm, and most preferably from about 3 μm to about 20 μm.

The supported catalysts of the present invention, when used in a slurry process or gas phase process, not only are able to produce ethylene copolymers of densities typical for high density polyethylene, in the range of 0.970 to 0.940 g/cm$^3$, but surprisingly, also enable the production of copolymers having substantially lower densities. Copolymers of densities lower than 0.940 g/cm$^3$ and especially lower than 0.930 g/cm$^3$ down to 0.880 g/cm$^3$ or lower can be made while retaining good bulk density properties and while preventing or substantially eliminating reactor fouling. The present invention is capable of producing ethylene polymers and copolymers having weight average molecular weights of up to 1,000,000 and even higher.

In the polymerization process of the present invention, impurity scavengers may be used which serve to protect the supported catalyst from catalyst poisons such as water, oxygen, and polar compounds. These scavengers can generally be used in amounts depending on the amounts of impurities and are typically added to the feed of monomers and diluent or to the reactor. Typical scavengers include trialkyl aluminum or boron compounds and alumoxanes.

In the present polymerization process, also, molecular weight control agents can be used, such as hydrogen or other chain transfer agents.

Having described the invention, the following examples are provided as further illustration thereof and are not to be construed as limiting. Unless stated to the contrary, all parts and percentages are expressed on a weight basis.

EXAMPLES

In the examples, the following support materials were used: granular silica available from Grace GmbH under the designation SD 3216.30; a spherical agglomerated silica available as SYLOPOL 2212 from Grace Davison (division of W. R. Grace & Co.) having a surface area of 250 m$^2$/g and a pore volume of 1.4 cm$^3$/g. Unless indicated otherwise, the silicas used have been heated at 250° C. for 3 hours under vacuum to give a final water content of substantially 0 as determined by differential scanning calorimetry. Where a silica is used containing water, it was used as supplied, without heat pretreatment.

Alumoxane was used as a 10 weight percent solution of methylalumoxane (MAO) in toluene available from Witco GmbH. Metallocene was used as a 0.0714M solution of {(tert-butylamido) (tetramethyl-η$^5$-cyclopentadienyl) (dimethyl) silane} titanium dimethyl (hereinafter MCpTi) in ISOPAR™ E (trademark of Exxon Chemical Company).

The bulk density of the polymers produced was determined according to ASTM 1895. The aluminum content on the support material was determined by treatment with sulfuric acid, followed by EDTA addition and back titration with zinc chloride.

All experiments were performed under a nitrogen atmosphere, unless indicated otherwise.

Example 1

A 1000 mL flask was charged with 11.1 g of silica SD 3216.30. 300 g of MAO solution was added and the mixture stirred for 16 hours. Then the solvent was removed under reduced pressure at 20° C. to yield 38 g of a free-flowing powder having an aluminum content of 31.6 percent. The sample was split into four equal portions of 9 g and each was heated at a different temperature for 2 hours under reduced pressure. After this treatment, the aluminum content of each sample was measured and then each was slurried in toluene (100 mL) and the mixture stirred for 1 hour, filtered, and then the supports washed with two 50 mLmL portions of fresh toluene and dried under vacuum at 120° C. for 1 hour. The results of the aluminum analyses are summarized below.

TABLE I

| Heat Treatment/Room Temperature Toluene Wash | | |
|---|---|---|
| T [° C.] | [Al] After Heating (wt %) | [Al] After Washing (wt %) |
| 125 | 30.7 | 20.3 |
| 150 | 30.0 | 25.7 |

TABLE I-continued

| Heat Treatment/Room Temperature Toluene Wash | | |
|---|---|---|
| T [° C.] | [Al] After Heating (wt %) | [Al] After Washing (wt %) |
| 175 | 30.8 | 30.3 |
| 200 | 31.1 | 31.4 |

The above procedure was repeated but with 12.1 g silica, and 327 g MAO solution to yield 42 g of free-flowing powder having an aluminum content of 31.3 percent. This sample was split into four equal portions and each was heated as described above, and then subjected to the same wash procedure except that toluene of 90° C. was used. The results are summarized in Table II.

TABLE II

| Heat Treatment/90° C. Toluene Wash | | |
|---|---|---|
| T [° C.] | [Al] After Heating (wt %) | [Al] After Washing (wt %) |
| 125 | 31.0 | 16.4 |
| 150 | 30.7 | 23.8 |
| 175 | 30.7 | 29.3 |
| 200 | 31.0 | 29.1 |

These examples show that, for heat treatments of the duration, an increase in the heat treatment temperature results in more alumoxane becoming fixed to the silica. The 90° C. toluene wash results in an increased percentage of non-fixed aluminum being removed, compared to the room temperature toluene wash for wash treatments of the same duration.

Example 2

A 250 ml, flask was charged with 6.2 g of silica SD 3216.30. 168 g of MAO solution was added and the mixture stirred for 16 hours. After this time, the toluene was removed under reduced pressure at 20° C., and then the solids were dried under vacuum for 16 hours at 20° C. to yield a free-flowing powder. The weight of the solid was 22.1 g and the aluminum content was 26.8 percent.

Example 3

The procedure of Example 2 was repeated using 3 g silica and 56.6 g of MAO solution to give 7.6 g of a free-flowing powder having an aluminum content of 26.1 percent. 5.2 g of this support was slurried in toluene (50 mL) at 20° C. and the mixture stirred for 1 hour. The mixture was filtered and the support washed with two 20 mL portions of fresh toluene and then dried under vacuum at 20° C. for 1 hour. The weight was 3.0 g and the aluminum content was 18.2 percent.

Example 4

The procedure of Example 2 was repeated using 3 g of silica and 75.6 g of MAO solution to give a free-flowing powder. This powder was then heated at 100° C. for two hours under vacuum. The weight was 8.4 g and the aluminum content was 29.0 percent. 4.4 g of this support was slurried in toluene (50 mL) at 20° C. and the mixture stirred for 1 hour. The mixture was filtered and the support washed with two 20 mL portions of fresh toluene and then dried under vacuum at 20° C. for 1 hour. The weight was 2.2 g and the aluminum content was 17.3 percent.

Example 5

The procedure of Example 2 was repeated using 3 g silica and 56.6 g MAO solution to give a free-flowing powder. The powder was heated for two hours at 150° C. under vacuum. The weight obtained was 7.2 g and the aluminum content 26.6 percent.

Example 6

The procedure of Example 2 was repeated using a 1000 mL flask, 12.1 g of silica, and 327 g of MAO solution to yield a free-flowing powder. 9.5 g of this powder was then heated at 175° C. for two hours under vacuum. The aluminum content was measured as 30.7 percent. 2.7 g of this support was slurried in hexane (40 mL) at 20° C. and the mixture stirred for 4 hours. The mixture was filtered and the support washed with two 30 mL portions of fresh hexane and then dried under vacuum at 20° C. for 1 hour. The weight was 2.4 g and the aluminum content was 30.4 percent.

Example 7

The procedure of Example 2 was followed. This powder was then heated at 150° C. for two hours under vacuum. The weight was 7.25 g and the aluminum content was 26.6 percent. 3 g of the support obtained was slurried in toluene (40 mL) at 20° C. and the mixture stirred for 1 hour. The mixture was filtered and the support washed with two 10 mL portions of fresh toluene and then dried under vacuum at 20° C. for 1 hour. The weight was 2.4 g and the aluminum content was 24.1 percent.

Example 8

The procedure of Example 2 was repeated using 3 g of silica and 75.5 g of MAO solution to yield a free-flowing powder. This powder was heated at 150° C. for two hours under vacuum. The weight was 8.4 g and the aluminum content was 29.8 percent. 5 g of this support was slurried in toluene (40 mL) at 20° C. and the mixture stirred for 1 hour. The mixture was filtered and the support washed with two 20 mL portions of fresh toluene and then dried under vacuum at 20° C. for 1 hour. The weight was 4.5 g and the aluminum content was 28.9 percent.

Example 9

The procedure of Example 2 was repeated using a 1000 ml, flask, 9.1 g silica and 246 g MAO solution to give a free-flowing powder. This powder was then heated at 150° C. for two hours under vacuum. The weight was 29.0 g and the aluminum content was 29.6 percent. This support was slurried in toluene (300 mL) at 20° C. and the mixture stirred for 1 hour. The mixture was filtered and the support washed with two 100 mL portions of fresh toluene and then dried under vacuum at 20° C. for 1 hour. The weight was 24.3 g and the aluminum content was 28.5 percent.

Example 10

The procedure of Example 2 was repeated using 5 g silica and 101 g MAO solution to yield a free-flowing powder. The powder was heated at 175° C. for two hours under vacuum. The aluminum content of this material was 28.8 percent. The powder (12.8 g) was reslurried in toluene (130 mL) and the mixture heated to 90° C. and stirred for 1 hour. The mixture was filtered and the resulting solid washed with two 50 mL portions of fresh toluene at 90° C. The support was then dried under vacuum at 120° C. for 1 hour. 10.4 g of support was obtained having an aluminum content of 26.3 percent.

Example 11

The procedure of Example 2 was repeated using 10 g silica and 76 g MAO solution to give a free-flowing powder. This powder was heated at 175° C. for two hours under vacuum. The aluminum content of this material was 17.2 percent. The powder (15.6 g) was reslurried in toluene (150 mL) and the mixture heated to 90° C. and stirred for 1 hour. The mixture was filtered and the resulting solid washed with two 50 mL portions of fresh toluene at 90° C. The support was then dried under vacuum at 120° C. for 1 hour. 13.0 g of support was obtained having an aluminum content of 16.3 percent.

Example 12

The procedure of Example 2 was repeated using 5 g silica SD 3216.30 having a water content of 2.8 percent, and 101 g of MAO solution to give a free-flowing powder. This powder was heated at 1 75° C. for two hours under vacuum. The aluminum content of this material was 29.4 percent. The powder (13 g) was reslurried in toluene (130 mL) and the mixture heated to 90° C. and stirred for 1 hour. The mixture was filtered and the resulting solid washed with two 50 mL portions of fresh toluene at 90° C. The support was then dried under vacuum at 120° C. for 1 hour. 11.5 g of support was obtained having an aluminum content of 29.0 percent.

Example 13

The procedure of Example 2 was repeated using a 1000 mL flask, 9 g of SYLOPOL 2212 and 243 g MAO solution to give a free-flowing powder. This powder was heated at 150° C. for two hours under vacuum. The weight was 29.3 g and the aluminum content was 29.8 percent. This support was slurried in toluene (300 mL) at 20° C. and the mixture stirred for 1 hour. The mixture was filtered and the support washed with two 100 mL portions of fresh toluene and then dried under vacuum at 120° C. for 1 hour. The weight was 25.9 g and the aluminum content was 29.3 percent.

Example 14

The procedure of Example 2 was repeated using a 1000 mL flask, 9.1 g silica and 246 g MAO solution to give a free-flowing powder. This powder was heated at 175° C. for two hours under vacuum. The weight was 30.8 g and the aluminum content was 30.0 percent. This support was slurried in toluene (300 mL) at 20° C. and the mixture stirred for 1 hour. The mixture was filtered and the support washed with two 100 mL portions of fresh toluene and then dried under vacuum at 120° C. for 1 hour. The weight was 27.1 g and the aluminum content was 29.0 percent.

Example 15

The procedure of Example 2 was repeated using 5.1 g silica and 101 g MAO solution to give a free-flowing powder. 6.8 g of this powder was heated at 100° C. for two hours under vacuum. The support was then slurried in toluene (100 mL) at 90° C. and the mixture stirred for 1 hour. The mixture was filtered and the support washed with two 50 mL portions of fresh toluene (90° C.) and then dried under vacuum at 100° C. for 1 hour. The weight was 3.4 g and the aluminum content was 16.6 percent.

Example 16

The procedure of Example 2 was repeated using 5.1 g silica and 101 g MAO solution to give a free-flowing powder. 6.8 g of this powder was slurried in toluene (100 mL) at 90° C. and the mixture stirred for 1 hour. The mixture was filtered and the support washed with two 50 mL portions of fresh toluene (90° C.) and then dried under vacuum at 100° C. for 1 hour. The weight was 3.0 g and the aluminum content was 13.4 percent.

Example 17

TIhe procedure of Example 2 was repeated using 5 g of silica SD 3216.30 containing 2.8 percent of water, and 101 g MAO solution to give a free-flowing powder. 6 g of this powder was slurried in toluene (100 mL) at 90° C. and the mixture stirred for 1 hour. The mixture was filtered and the support washed with two 50 mL portions of fresh toluene (90° C.) and then dried under vacuum at 20° C. for 1 hour. The weight was 2.9 g and the aluminum content was 16.4 percent.

Example 18

The procedure of Example 2 was repeated using 5 g of silica SD 3216.30 containing 2.8 percent of water, and 101 g MAO solution to give a free-flowing powder. This powder was heated at 100° C. for 2 hours. 6 g of this powder was slurried in toluene (100 mL) at 90° C. and the mixture stirred for 1 hour. The mixture was filtered and the support washed with two 50 mL portions of fresh toluene (90° C.) and then dried under vacuum at 20° C. for 1 hour. The weight was 3.8 g and the aluminum content was 22.2 percent.

Example 19
Preparation of Supported Catalysts

Supported catalysts were prepared from the supported catalyst components prepared in Examples 2–18 according to the following procedure.

Typically, 1 g of support component was slurried in 20 mL hexane and the mixture stirred for 30 minutes. An aliquot of MCpTi solution (0.0714M) was added sufficient to give a transition metal loading as shown in Table III. This mixture was stirred for 30 minutes and then transferred to a polymerization reactor.
Polymerization A 10 L autoclave reactor was charged with 6 L anhydrous hexane, co-monomer if required, hydrogen gas if required, and the contents were heated to 80° C., unless otherwise stated. Ethylene was added to raise the pressure to the desired level. The amount of the supported catalyst indicated in Table III was added through a pressurized addition cylinder. Ethylene was supplied to the reactor continuously on demand. After the desired polymerization time, the ethylene line was blocked and the reactor contents were dumped into a sample container. The hexane was decanted from the polymer and the polymer dried overnight and then weighed to determine the yield.

In run 22, the temperature was 70° C., and 100 mL of 1-octene comonomer was added to the reactor to give an ethylene/1-octene copolymer of density 0.9266 g/cm$^3$. In run 23, the temperature was 50° C., and 200 mL of 1-octene comonomer was added to the reactor to give an ethylene/1-octene copolymer of density 0.9230 g/cm$^3$.

The specific polymerization conditions and results are summarized in Table III. The data in this table show that high bulk density polymers can be prepared from supported catalyst components prepared with various combinations of heat and/or wash treatments. The highest efficiencies result from supported catalyst components and catalysts containing more than 20 percent Al by weight. Superior efficiencies are obtained from supported catalyst components subjected to dispersion in 90° C. toluene. Poor bulk densities (runs 1–3) result from supported catalyst components which have either not been heat-treated at a sufficiently high temperature or for a sufficiently long time, or have not been sufficiently washed.

TABLE III

Polymerization Runs

| Run No. | Com-ponent From Ex. No. | Al[1] (wt %) | Ti[2] (μmol/g) | Al/Ti[3] | [Ti][4] (μmol) | Pressure[5] (bar) | Time[6] (min) | Yield[7] (g) | E(Ti)[8] [gPE/gTi/hr] | E(SiO$_2$)[9] [gPE/gSiO$_2$/hr] | E(Al)[10] [gPE/gAl/hr] | Bulk Dens. (g/cm$^3$) |
|---|---|---|---|---|---|---|---|---|---|---|---|---|
| 1 | 2 | 26.8 | 40 | 248 | 40 | 10 | 30 | 100 | 104,384 | 471 | 746 | 0.05 |
| 2 | 3 | 18.2 | 40 | 169 | 56 | 10 | 50 | 97 | 43,394 | 137 | 457 | 0.09 |
| 3 | 4 | 17.3 | 40 | 160 | 40 | 10 | 38 | 137 | 112,900 | 344 | 1,250 | 0.13 |
| 4 | 5 | 26.6 | 40 | 246 | 40 | 10 | 35 | 171 | 152,997 | 684 | 1,102 | 0.20 |
| 5 | 6 | 30.4 | 40 | 281 | 40 | 10 | 30 | 255 | 266,180 | 1,470 | 1,678 | 0.24 |
| 6 | 15 | 16.6 | 40 | 154 | 20 | 15 | 60 | 179 | 186,848 | 556 | 2,157 | 0.35 |
| 7 | 16 | 13.4 | 40 | 124 | 20 | 15 | 60 | 120 | 125,261 | 337 | 1,791 | 0.33 |
| 8 | 17 | 16.4 | 40 | 152 | 20 | 15 | 60 | 185 | 193,111 | 571 | 2,256 | 0.37 |
| 9 | 18 | 22.2 | 40 | 206 | 20 | 15 | 60 | 315 | 328,810 | 1,204 | 2,838 | 0.38 |
| 10 | 7 | 24.1 | 40 | 223 | 40 | 10 | 72 | 180 | 78,288 | 311 | 622 | 0.35 |
| 11 | 8 | 28.9 | 40 | 268 | 40 | 10 | 135 | 800 | 185,572 | 938 | 1,230 | 0.41 |
| 13 | 9 | 28.5 | 40 | 264 | 15 | 15 | 60 | 245 | 340,988 | 1,685 | 2,292 | 0.39 |
| 14 | 9 | 28.5 | 20 | 528 | 10 | 15 | 200 | 1000 | 626,305 | 1,547 | 2,105 | 0.43 |
| 15 | 14 | 29.0 | 20 | 537 | 20 | 15 | 180 | 1000 | 347,947 | 884 | 1,149 | 0.33 |
| 16 | 13 | 29.3 | 20 | 543 | 10 | 15 | 60 | 363 | 757,829 | 1,959 | 2,478 | 0.31 |
| 17 | 10 | 26.3 | 40 | 244 | 20 | 15 | 30 | 375 | 782,881 | 3,448 | 5,703 | 0.35 |
| 18 | 10 | 26.3 | 40 | 244 | 20 | 15 | 60 | 720 | 751,566 | 3,310 | 5,475 | 0.38 |
| 19 | 10 | 26.3 | 70 | 139 | 17.5 | 15 | 120 | 1005 | 599,493 | 4,620 | 7,643 | 0.34 |
| 20 | 11 | 16.3 | 40 | 151 | 80 | 15 | 27 | 430 | 249,632 | 735 | 2,931 | 0.33 |
| 21 | 12 | 29.0 | 40 | 269 | 20 | 15 | 60 | 650 | 678,497 | 3,448 | 4,483 | 0.35 |
| 22 | 12 | 29.0 | 40 | 269 | 40 | 10 | 22 | 207 | 294,648 | 1,497 | 1,947 | 0.36 |
| 23 | 12 | 29.0 | 40 | 269 | 80 | 10 | 45 | 207 | 72,025 | 366 | 476 | 0.33 |

[1]Aluminum content of supported catalyst component
[2]Titanum content of supported catalyst in μmol/g support (silica + MAO)
[3]Mole ratio of aluminium and titanium in supported catalyst
[4]μmol of titanium added to reactor in form of supported catalyst
[5]Total polymerization pressure
[6]Polymerization time
[7]Grams of polymer produced
[8]Catalyst efficiency expressed per g Ti in the supported catalyst
[9]Catalyst efficiency expressed per g silica in the supported catalyst
[10]Catalyst efficient expressed per g Al in the supported catalyst

Example 20

The procedure of Example 2 was repeated using 6.2 g of silica SD 3216.30, and 68 g MAO solution to give 22.1 g of free-flowing powder having an aluminum content of 27.8 percent. 11 g of this support was slurried in toluene (75 mL) and 440 micromoles of MCpTi (6.16 mL of a 0.0714M solution in hexane) was added. The mixture was stirred 1 hour and then the solvent was removed under reduced pressure and the residue heated at 150° C. for two hours. This yielded 11 g of a free-flowing powder having an aluminum content 28.2 percent. The material was slurried in toluene (100 mL) and the mixture stirred for 1 hour, filtered, and the solids washed with two 50 mL portions of fresh toluene and then dried under vacuum at 100° C. for 1 hour. The weight was 9 g, the aluminum content was 24.8 percent, and the Ti content was 40 micromoles/g.

Example 21

The procedure of Example 6 was repeated using 12.1 g of silica SD 3216.30, and 327 g MAO solution to give a free-flowing powder. 9.1 g of this powder was heated at 150° C. under vacuum for 2 hours to yield a material with an aluminum content of 30.7 percent. 3.5 g of this powder was slurried in toluene (35 mL) and 140 micromoles of MCpTi (1.96 mL of a 0.0714M solution in hexane) added and the mixture stirred for 1 hour. The mixture was filtered and the support washed with six 50 mL portions of fresh toluene (at which point the washings were colorless) and then dried under vacuum at 20° C. for 1 hour. The weight was 22.0 g and the Ti content 30 micromoles/g.

Example 22

The procedure of Example 2 was repeated using 3.0 g of silica SD 3216.30, and 82 g MAO solution to give 10.5 g of free-flowing powder. 4.85 g of this powder was slurried in toluene (50 mL) and the mixture stirred for one hour. The mixture was filtered and the support washed with two 20 mL portions of fresh toluene and then heated under vacuum at 150° C. for 2 hours. The weight was 2.1 g and the aluminum content was 14.9 percent. MCpTi was added according to the procedure of Example 19.

Example 23

A 250 mL flask was charged with 3.3 g of silica SD 3216.30. Toluene (80 mL) was added to the slurry followed by 130 micromoles of MCpTi (1.82 mL of a 0.0714M solution in hexane) and the mixture stirred for two hours. 101 g of MAO solution was added and the mixture stirred for 16 hours. After this time, the solvent was removed under reduced pressure, at 20° C., to yield a free-flowing powder.

Following the general polymerization procedure of Example 19, using the specific conditions mentioned in Table IV, the results indicated in the same table were obtained.

The data in this table show that a low activity catalyst results when the metallocene is added before a heat treatment of 150° C. (Example 20). A reasonable bulk density is obtained when the metallocene is added after the heat step, but prior to wash step (Example 21). A good bulk density results when the wash step is performed prior to the heating step (Example 22). An inactive catalyst results when the metallocene is first added to the silica (Example 23).

TABLE IV

Polymerization Runs

| Example No. | $Al^1$ (wt %) | $Ti^2$ ($\mu$mol/g) | $Al/Ti^3$ | $[Ti]^4$ ($\mu$mol) | Pres-sure[5] (bar) | Time[6] (min) | Yield[7] (g) | $E(Ti)^8$ [gPE/gTi/hr] | $E(SiO_2)^9$ [gPE/gSiO$_2$/hr] | $E(Al)^{10}$ [gPE/gAl/hr] | Bulk Dens. (g/cm$^3$) |
|---|---|---|---|---|---|---|---|---|---|---|---|
| 20 | 24.8 | 40 | 227 | 40 | 10 | 25 | 13 | 16,284 | 67 | 126 | — |
| 21 | 22.0 | 30 | 272 | 30 | 10 | 60 | 167 | 116,214 | 317 | 759 | 0.28 |
| 22 | 14.9 | 40 | 138 | 40 | 10 | 60 | 141 | 73,591 | 207 | 946 | 0.32 |
| 23 | 26.6 | 40 | 246 | 40 | 10 | 30 | 0 | 0 | 0 | 0 | — |

Footnotes are same as for Table III

Example 24

The procedure of Example 1 was repeated except that after removing the solvent from the MAO/silica mixture under reduced pressure at 20° C., portions of the resulting powder were subjected to two hour heat treatments and optional wash treatments as summarized in Table V. After these treatments, the supported catalyst components were, on the one hand, extracted with 90° C. toluene to establish the percentage aluminum extractables, and, on the other hand, used in polymerization reactions. All wash and extraction steps were performed with about 1 g support per 10 mL toluene, stirred for one hour, then filtered and washed with 2 times 5 mL toluene per gram initial support. The supported catalysts were prepared according to the general procedure described in Example 19. All polymerizations were performed at 15 bar total pressure at 80° C. for one hour. The results are given in Table VI. The examples show that at extractable aluminum percentages well below 10 percent, excellent bulk densities are obtained.

The 175° C. heat treatment alone in run 1, without any wash treatment, enabled polymers of good bulk density to be made.

TABLE V

Extraction Test

| Run No. | Heat Treatment Temp. [° C.] | 20° C. Toluene Wash | Al in Catalyst Support [%] | Al After Extraction [%] | Extracted Al [%] | Bulk Density [g/cm$^3$] |
|---|---|---|---|---|---|---|
| 1 | 175 | no | 29.8 | 27.9 | 6.4 | 0.35 |
| 2 | 175 | yes | 28.3 | 27.9 | 5.0 | 0.34 |
| 3 | 165 | no | 30.5 | 27.6 | 10 | 0.12 |
| 4 | 165 | yes | 29.3 | 27.6 | 5.8 | 0.31 |
| 5 | 125 | no | 30.1 | 20.9 | 33 | 0.06 |
| 6 | 75 | yes | 16.6 | 15.9 | 4.2 | 0.34 |

TABLE VI

Polymerization Runs

| Run No. | Ti$^2$ ($\mu$mol/g) | Al/Ti$^3$ | [Ti]$^4$ ($\mu$mol) | Yield$^7$ (g) | E(Ti)$^8$ [gPE/gTi/hr] | E(SiO$_2$)$^9$ [gPE/gSiO$_2$/hr] | E(Al)$^{10}$ [gPE/gAl/hr] | Bulk Dens. (g/cm$^3$) |
|---|---|---|---|---|---|---|---|---|
| 1 | 40 | 276 | 20 | 415 | 433,194 | 2,307 | 2,785 | 0.35 |
| 2 | 40 | 262 | 20 | 400 | 417,537 | 2,040 | 2,827 | 0.34 |
| 3 | 40 | 282 | 20 | 330 | 344,468 | 1,914 | 2,164 | 0.12 |
| 4 | 40 | 271 | 20 | 260 | 271,399 | 1,403 | 1,775 | 0.31 |
| 5 | 40 | 278 | 20 | 312 | 325,678 | 1,766 | 2,073 | 0.06 |
| 6 | 40 | i51 | 20 | 130 | 135,699 | 404 | 1,566 | 0.34 |

Footnotes are same as for Table III

Example 25

The procedure of Example 2 was repeated using 5 g silica and 101 g MAO solution to give a free-flowing powder. The powder was heated at 100° C. for eight hours under vacuum to yield 12.5 g of material. The support was then slurried in toluene (125 mL) at 90° C. and the mixture stirred for one hour. The mixture was filtered and the support washed with two 50 mL portions of fresh toluene (90° C.) and then dried under vacuum at 100° C. for one hour. The weight was 11.1 grams and the aluminum content was measured as 26.1 percent by weight. According to the procedures of Example 19 and using the amounts in Table VII, a polymerization experiment was performed at 15 bar total pressure, 80° C., for one hour. The results are included in Table VII.

TABLE VII

Polymerization Run

| Ti$^2$ [$\mu$mol/g] | Al/Ti$^3$ | [Ti]$^4$ ($\mu$mol) | Yield$^7$ (g) | E(Ti)$^8$ [gPE/g Ti/hr] | E(SiO2)$^9$ [gPE/gSiO$_2$/hr] | E(Al)$^{10}$ [gPE/gAl/hr] | Bulk Dens. (g/cm$^3$) |
|---|---|---|---|---|---|---|---|
| 40 | 242 | 20 | 365 | 381,002 | 1,662 | 2,797 | 0.33 |

Footnotes are the same as in Table III

Example 26

The procedure of Example 5 from U.S. Pat. No. 5,240,894 was essentially repeated to form a supported catalyst component as follows. 0.58 $\mu$moles of MCpTi (8.1 mL of a 0.0714M solution) was added to 35 mL toluene. To this was added 75 mL of 10 weight percent MAO in toluene and the mixture stirred for 15 minutes. Silica (5 g, SD 3216.30, pretreated at 250° C. for three hours) was added and the mixture stirred 20 minutes. The mixture was heated at 65° C. under vacuum for 75 minutes and the dried solid washed with 2×70 mL pentane, filtered and dried under high vacuum to give a yellow solid (8 g) having an aluminum content of 18.1 percent by weight. A toluene extraction at 90° C. followed by drying gave a yellow solid with an aluminum content of 16.2 percent by weight. The extractable aluminum percentage is 10.5 percent. Upon washing, some MCpTi was lost and also upon the hot toluene extraction, as indicated by the yellow color of the supernatant. Polymerization experiments following the general procedure of Example 19 were performed with a supported catalyst that was not treated with hot toluene (run 1) and with one that was treated with hot toluene (run 2). The results are given in Table VIII.

The results show that the non-toluene-treated catalyst (having 10.5 percent extractable Al) gives a poor bulk density. Subjecting the obtained supported catalyst to a hot toluene extraction greatly improves the bulk density (run 2).

polymerization as generally described in Example 19 at 80° C. The other conditions and results are mentioned in Table IX. These results show that using an extended dispersion period before the transition metal compound is added results in increased catalytic activity (compare with Table III).

TABLE IX

| Run No. | Transition Metal Compound | Al(wt. %) | Ti (µmol/g) | Al/Ti | [Ti] (µmol) | Time (min) | Yield (g) | E(Ti)[gPE/ gTi/hr] | E(SiO2)[gPE/ dSio2/hr] | E(Al) [gPE/ gAl/hr] | Bulk Dens. (g/cm$^3$) |
|---|---|---|---|---|---|---|---|---|---|---|---|
| 1 | MCpTi | 27.5 | 120 | 85 | 30 | 79 | 950 | 502,101 | 7,052 | 10,495 | 0.37 |
| 2 | MCpTi | 26.4 | 80 | 122 | 20 | 85 | 1020 | 751,566 | 6,653 | 10,909 | 0.35 |
| 3 | MCpTi | 27.5 | 100 | 102 | 30 | 60 | 1000 | 695,894 | 8,145 | 12,121 | 0.27 |
| 4 | MCpTi(II) | 25.7 | 40 | 238 | 20 | 56 | 900 | 1,006,561 | 4,036 | 7,504 | 0.32 |

TABLE VIII

| Run No. | Al (%) | Time (min) | Yield (g) | Bulk Dens. (g/cm3) |
|---|---|---|---|---|
| 1 | 18.1 | 60 | 175 | 0.10 |
| 2 | 16.2 | 60 | 50 | 0.30 |

Example 27

A 1000 mL flask was charged with 508 g of 10 percent MAO solution in toluene and 25 g of silica SYLOPOL 2212 having a water content of 3.5 percent was added while continuously stirring. The mixture was stirred for a further two hours and then the solvent was removed under reduced pressure at 20° C. to yield a free-flowing powder. This powder was then heated at 175° C. for two hours under vacuum. The powder was reslurried in toluene (700 mL) and the mixture was heated and refluxed for one hour. The mixture was filtered and the support washed with two 200 mL portions of fresh toluene at about 100° C. The support was then dried under vacuum at 120° C. for 1 hour. 63.9 g of support was obtained having an aluminum content of 26.4 percent. A sample of the support was slurried in toluene, agitated for one hour, and then the particle size distribution was measured on a Malvern Mastersizer X instrument. This indicated d(v, 0.5) to be approximately 12 microns. According to this procedure further supported catalyst components were prepared having slightly different aluminum loadings.

A weighed amount of the support components was slurried in hexane and the mixture stirred for 16 hours before addition of the MCpTi component (runs 1–3) or {(tert-butylamido)(tetramethyl-η$^5$-cyclopentadienyl) (dimethyl) silane} titanium η$^4$-1,3-pentadiene (hereinafter MCpTi(II) in run 4). Subsequently, MCpTi or MCpTi(II) was added (in ISOPAR™ E) in the amounts as indicated in Table IX. The supported catalysts thus prepared were subjected to slurry polymerization as generally described in Example 19 at 80° C.

Example 28

A 3 L autoclave reactor was charged with an amount of 1-octene as indicated in Table X followed by an amount of Isopar™ E sufficient to give a total volume of 1500 mL. 300 mL of hydrogen gas was added and the reactor contents were heated to the desired temperature. Ethylene was then added sufficient to bring the pressure of the system to 30 bar. A supported catalyst was added to initiate the polymerization and ethylene was supplied to the reactor continuously on demand. After the desired polymerization time, the ethylene line was blocked and the reactor contents were dumped into a sample container. The polymer was dried overnight and then weighed to determine catalyst efficiencies. The results are described in Table X, wherein the molecular weight distribution ($M_w/M_n$) is derived from gel permeation chromatography, and the melt index $I_2$ is determined according to ASRM D-1238–65T (at 190° C. and 2.16 kg load).

The following supported catalysts were used in the polymerizations. A support containing 23.8 percent aluminum on dehydrated SD 3216.30 silica was prepared in a manner similar to Example 10. In runs 1–3, 0.075 g of support was slurried in Isopar™, and stirred for a few minutes. An aliquot of MCpTi solution (0.0714M) was added, sufficient to give a titanium loading of 20 µmoles/g. This mixture was stirred for a few minutes and then transferred to the polymerization reactor. In runs 4–6, 0.3 g of support was used and the same titanium loading.

TABLE X

| Run No. | 1-octene[ml] | Time [min] | Yield [gram] | Average Temp.[° C.] | Efficiency [gPE/gTi] | $I_2$ [g/10 min] | Density [g/cm$^3$] | $M_w/M_n$ |
|---|---|---|---|---|---|---|---|---|
| 1 | 302 | 20 | 69 | 81 | 960,334 | 0.25 | 0.882 | 2.18 |
| 2 | 382 | 20 | 55 | 80 | 765,484 | 0.25 | 0.873 | 2.09 |
| 3 | 456 | 17 | 35 | 80 | 487,126 | 0.41 | 0.870 | 2.09 |
| 4 | 455 | 20 | 244 | 133 | 848,990 | 1.30 | 0.877 | 2.44 |
| 5 | 455 | 20 | 217 | 143 | 755,045 | 0.47 | 0.882 | 2.88 |
| 6 | 457 | 20 | 200 | 152 | 695,894 | 0.33 | 0.880 | 2.99 |

When used in a solution polymerization process, the supported catalysts show good efficiencies and make narrow molecular weight distribution polymers.

Example 29

In the present example, continuous polymerization runs are described. These runs were performed using a supported catalyst prepared according to a procedure similar to that of Example 27. The support contained 25 weight percent of aluminum. In all runs, the loading of MCpTi was 40 µmoles/g.

Isopentane, ethylene, 1-butene, hydrogen and supported catalyst were continuously fed into a 10 L jacketed, continuously stirred tank reactor and the slurry product formed was removed continuously. The total pressure in all polymerization runs was 15 bar. The slurry withdrawn was fed to a fish tank to remove the diluent and the dry, free-flowing polymer powder was collected. Table XI summarizes the conditions and the properties of the products made. The melt index values were measured according to ASTM D-1238-65T (at 190° C. and a load of 21.6 kg, abbreviated as $I_{21}$). The butene content of the polymer was determined by infrared spectroscopy. The results indicate that high bulk density polymer powders can be produced over a wide density range, with particle morphology being retained.

TABLE XI

| Run No. | Isopen-tane Flow [g/h] | Ethyl-ene Flow [g/h] | Butene Flow [g/h] | Hydro-gen Flow [l/h] | T (° C.) | $I_{21.6}$ [g/10 min] | Density [g/cm$^3$] | Polymer Butene Content [wt %] | B.D. g/cm$^3$ |
|---|---|---|---|---|---|---|---|---|---|
| 1 | 2500 | 1600 | 195 | 0.54 | 60 | 1.28 | 09305 | 1.94 | 0.34 |
| 2 | 2500 | 1000 | 80 | 0.30 | 60 | 0.38 | 0.9136 | 5.58 | 0.34 |
| 3 | 2500 | 800 | 80 | 0.30 | 55 | 0.28 | 0.9190 | 6.34 | 0.38 |
| 4 | 2500 | 1150 | 125 | 0.30 | 55 | 0.18 | 0.9112 | 8.54 | 0.39 |
| 5 | 2500 | 850 | 100 | 0.30 | 55 | 0.21 | 0.9050 | 10.18 | 0.37 |
| 6 | 2500 | 675 | 100 | 0.30 | 55 | 0.45 | 0.9035 | 11.64 | 0.38 |
| 7 | 2500 | 550 | 160 | 0.50 | 35 | 1.40 | 0.8958 | 14.60 | 0.23 |

What is claimed is:

1. A supported catalyst comprising:
    A) a supported catalyst component comprising a support material and an alumoxane, which component contains 15 to 40 weight percent of aluminum from said alumoxane (based on the total weight of the support material and alumoxane), said supported catalyst component being obtained by
        a) heating said support material and alumoxane under an inert atmosphere or under less than atmospheric pressure at a temperature of from about 85 to about 250° C. for a period sufficient to fix said alumoxane to the support material, to provide a supported catalyst component; wherein not more than about 10 percent aluminum from said alumoxane and present in said supported catalyst component is extractable after stirring for one-hour in toluene at 90° C. using 10 ml toluene per gram of said supported catalyst component, filtering and washing twice with 5 ml of toluene per g of said supported catalyst component at 90° C.; and
    B) a transition metal compound.

2. The supported catalyst of claim 1 wherein the transition metal compound is a bridged monocyclopentadienyl group 4 transition metal compound (wherein the bridge is between the single cyclopentadienyl ligand and the metal atom) or a bridged biscyclopentadienyl group 4 transition metal compound (wherein the bridge is between the two cyclopentadienyl ligands).

3. The supported catalyst of claim 1 wherein the aluminum atom (from said alumoxane) to transition metal atom mole ratio is from 1:1 to 5,000:1.

4. The supported catalyst of claim 1 which contains from 0.1 to 1000 micromoles of transition metal compound per gram of support material.

5. The supported catalyst of claim 1 in prepolymerized form obtained by subjecting an olefin in the presence of the supported catalyst to polymerization conditions.

6. A process for preparing a supported catalyst comprising preparing a supported catalyst component comprising a support material and an alumoxane, which component contains 15 to 40 weight percent of aluminum from said alumoxane (based on the total weight of the support material and alumoxane), which process comprises:
    a) heating said support material and alumoxane under an inert atmosphere or under less than atmospheric pressure at a temperature of from about 85 to about 250° C. for a period sufficient to fix said alumoxane to the support material; and
    b) optionally subjecting the support material containing alumoxane to one or more wash steps to remove alumoxane not fixed to the support material; and selecting the period and temperature in heating step a and the number of optional washing steps b so as to form a supported catalyst component wherein not more than about 10 percent aluminum from said alumoxane and present in the supported catalyst component is extractable in a one hour extraction with toluene of 90° C. using 10 ml toluene per gram of supported catalyst component, filtering and washing twice with 5 ml of toluene per g of said supported catalyst component 90° C.; and
    c) adding, after step a or optional step b if employed, a transition metal compound, with the proviso that once the transition metal compound has been added, the product thus obtained is not subjected to temperatures equal to or higher than the decomposition temperature of the transition metal compound.

7. The process of claim 6 wherein heating step a is carried out at a temperature of from about 100 to about 250° C. for a period sufficient to fix said alumoxane to the support material and the wash step b is carried out by slurrying the supported catalyst component in an aromatic hydrocarbon and heating the slurry under reflux conditions of said aromatic hydrocarbon.

8. The process according to claim 6 wherein the support material containing said alumoxane is obtained by combining in a diluent a support material containing from 0 to not more than 20 weight percent of water, based on the total weight of support material and water with an alumoxane.

9. The process according to claim 6 wherein the support material containing alumoxane is obtained by combining in a diluent a support material containing from 5 to 30 weight percent water, based on the total weight of support material and water, with a compound of the formula $R''_{n^*}$ Al $X''_{3-n^*}$ wherein R'' independently each occurrence is a hydrocarbyl radical, X'' is halogen or hydrocarbyloxy, and n* is an integer from 1 to 3.

10. The process according to claim 6 wherein step a is carried out at a temperature of from about 160° C. to about 200° C.

11. The process according to claim 6 wherein the support material containing alumoxane is subjected to one to five wash steps using an aromatic hydrocarbon solvent.

12. The process of claim 6 wherein step a is carried out under less than atmospheric pressure.

13. The process of claim 6 wherein the support material is silica.

14. The process of claim 6 wherein the alumoxane is methylalumoxane.

15. The process of claim 6 wherein the transition metal compound is a bridged monocyclopentadienyl or mono (substituted cyclopentadienyl) group 4 transition metal compound (wherein the bridge is between the single cyclopentadienyl ligand and the metal atom) or a bridged biscyclopentadienyl or bis(substituted cyclopentadienyl) group 4 transition metal compound (wherein the bridge is between the two cyclopentadienyl ligands).

16. The process of claim 6 wherein the aluminum atom (from said alumoxane) to transition metal atom mole ratio in the supported catalyst is from 1:1 to 5,000:1.

17. The process of claim 6 wherein the supported catalyst contains from 0.1 to 1000 micromoles of transition metal compound per gram of support material.

18. The process of claim 6 further comprising subjecting an olefin in the presence of the supported catalyst to polymerization conditions to provide a prepolymerized supported catalyst.

19. The process according to claim 17 wherein the aromatic hydrocarbon is toluene, benzene, or xylene.

20. The process according to claim 19 wherein the aromatic hydrocarbon is toluene.

* * * * *